(No Model.)
G. HAGMANN.
PISTON ROD PACKING.
No. 509,803. Patented Nov. 28, 1893.
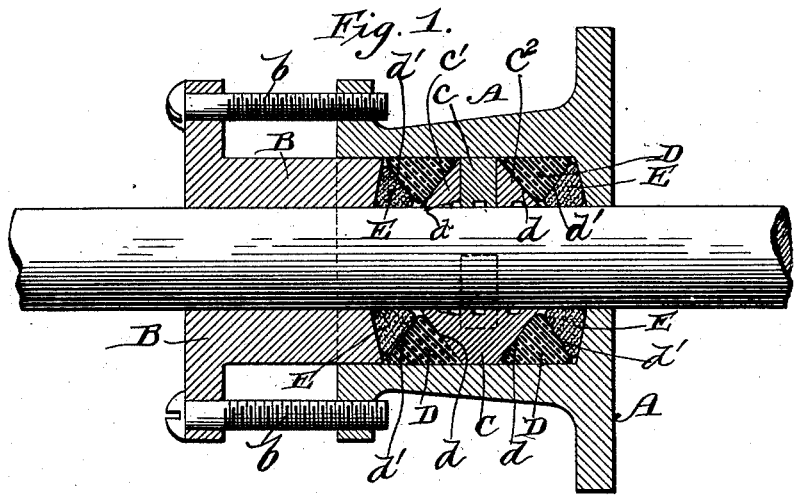
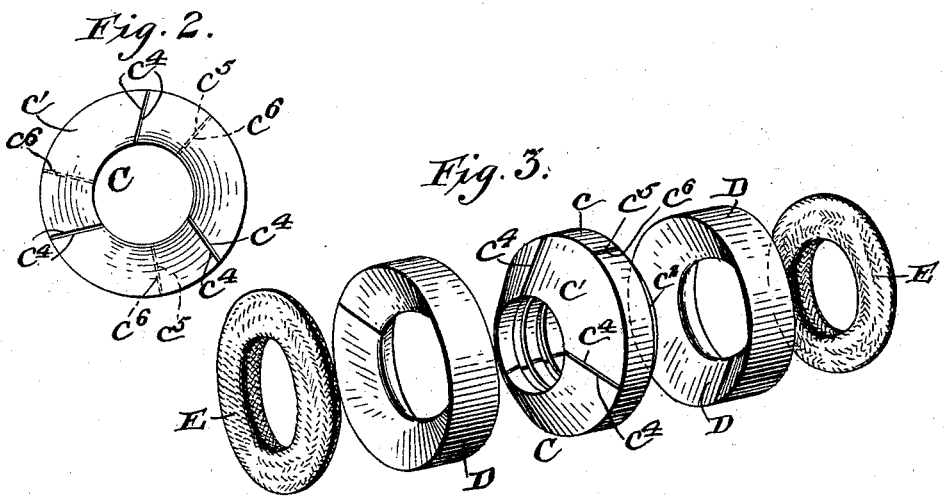
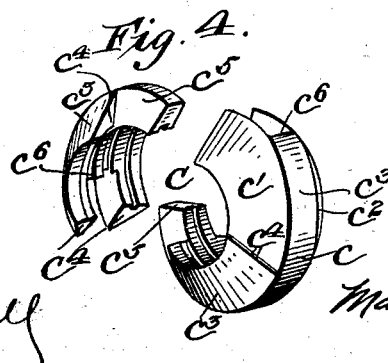
Witnesses
Severance
Joseph W. Buell
Inventor
George Hagmann
by
Mason Fenwick & Lawrence
Attorneys

United States Patent Office.

GEORGE HAGMANN, OF LA CROSSE, WISCONSIN, ASSIGNOR OF ONE-HALF TO THE JOHN JAMES COMPANY, OF SAME PLACE.

PISTON-ROD PACKING.

SPECIFICATION forming part of Letters Patent No. 509,803, dated November 28, 1893.

Application filed May 31, 1893. Serial No. 476,142. (No model.)

*To all whom it may concern:*

Be it known that I, GEORGE HAGMANN, a citizen of the United States, residing at La Crosse, in the county of La Crosse and State of Wisconsin, have invented certain new and useful Improvements in Piston-Rod Packing; and I do hereby declare the following to be a full, clear, and exact description of the invention, such as will enable others skilled in the art to which it appertains to make and use the same.

My invention relates to a piston rod packing, and it consists in certain novel constructions, combinations and arrangements of parts as will be hereinafter described and claimed.

In the accompanying drawings, Figure 1 is a longitudinal section of a stuffing box and follower provided with my improved packing, a piston rod being in position in the same. Fig. 2 is a side elevation of a segmentally divided metal packing ring. Fig. 3 represents perspective views of the different parts of the packing showing their relative arrangement, and Fig. 4 is a perspective view of the segmentally divided metallic packing ring, with its parts separated.

My improved packing is not composed of metallic rings alone but combines metallic and flexible rings of novel construction, and arranged with respect to each other in a special manner, as will be hereinafter described.

The chief objection to metallic packing has been that in order to secure satisfactory results it is absolutely necessary to have a perfectly smooth piston rod, running in perfect alignment, or else the rod would soon wear the packing and "spit" steam. I have found by practical tests that my packing can be placed on any rod whatever, whether creased or not, and irrespective of it being in true alignment.

In the accompanying drawings, A represents a piston rod stuffing box, which, when in use, is secured to the cylinder in the usual manner, and B is the gland or follower which is secured to the stuffing box by screws $b$ as shown. The packing is arranged in the stuffing box, and it consists mainly of a double truncated cone metallic segmentally divided ring C, rubber rings D, D of triangular form in cross section, arranged on both sides of the metallic ring, and two fibrous rings E, E arranged at the ends of the stuffing box, next to the rubber rings as shown. The metallic ring comprises a cylindrical portion $c$, and two reversely arranged, truncated cone portions $c'$, $c^2$, the bases of the cones uniting with the cylindrical portion $c$. This metallic ring is provided with a central bore, and is made preferably of three tongued and grooved sections or members $c^3$, the meeting or uniting faces $c^4$ $c^4$ of which are cut on oblique lines with respect to a radial line, extending from the cylindrical portion to the bore, in opposite directions; and the meeting faces $c^5$ of the tongues, and those $c^6$ of the grooves being cut on radial lines, so that when the parts are assembled, the metallic ring is permitted to vibrate in the stuffing box and accommodate itself to any irregularities in, or non alignment of the piston rod; this construction also forming "break" or angular joints which render leakage of steam through the joints less liable, if not impossible when the rubber packing is applied against its conical surfaces. The rubber rings D, D are triangular in cross section, by which construction closely fitting seats $d$ and $d'$ are formed for the metallic packing ring C and the fibrous packing rings E, E as shown. The metallic packing ring is made about one eighth of an inch smaller than the bore of the stuffing box, and its miter joints are cushioned on the triangular rubber rings, which renders the packing steam tight. The fibrous rings E, E are curved on one of their faces to snugly fit the flaring seat formed by the rubber packing rings D, D, and less curved on their other face to tightly bear against the follower or gland, as shown. The object of the fibrous packing rings is to keep the piston rod perfectly steam tight during the time the segmental metallic ring packing is being worn down to the irregularities of the piston rod. It will be observed that if the meeting faces $c^4$ $c^4$ of the metallic packing ring were radial instead of oblique the bearing through the packing would be unequal, or in some places there would be a bearing only on the tongues, whereas by making them oblique it admits of a bearing on the outside as well as on the tongues of the metallic packing ring, so that there is very little difference in the bearing pressure on the rod, of a section through the solid part of the metallic ring, or a section through the oblique cut, or in other words the pressure is made uniform throughout the ring and on the rod.

What I claim as my invention is—

1. In a piston rod packing, the combination with the piston rod and a stuffing box and follower arranged thereon, of a double truncated cone, metallic ring composed of tongued and grooved sections, a rubber ring triangular in cross section arranged on each side of the metallic ring and fitting the truncated cone faces thereof and having seats for fibrous packing rings, and fibrous packing rings fitted in the seats of the rubber packing, and of a shape to bear snugly upon the follower, substantially as described.

2. In a piston rod packing, the combination with the piston rod and a stuffing box and follower arranged thereon, of a double truncated metallic packing ring composed of tongued and grooved sections, the adjoining or meeting faces of the sections being cut on oblique and radial lines as described, rubber rings triangular in cross section arranged on each side of the metallic ring and fitting the truncated cone faces thereof and having seats for fibrous packing rings, and fibrous packing rings fitting in the seats of the rubber packing, and of a shape to bear snugly upon the follower, all arranged and operating substantially as and for the purpose described.

In testimony whereof I hereunto affix my signature in presence of two witnesses.

GEORGE HAGMANN.

Witnesses:
JOHN BRINDLEY,
ALFRED JAMES.